Aug. 5, 1952  M. K. LINGLE  2,606,043
INDEXING SYSTEM

Filed Aug. 20, 1947  5 Sheets—Sheet 1

INVENTOR.
Myron K. Lingle
BY
Tesch and Darbo
Attys

Aug. 5, 1952        M. K. LINGLE        2,606,043

INDEXING SYSTEM

Filed Aug. 20, 1947        5 Sheets-Sheet 2

INVENTOR.
*Myron K. Lingle*
BY
*Tesch and Darbo*
Attys.

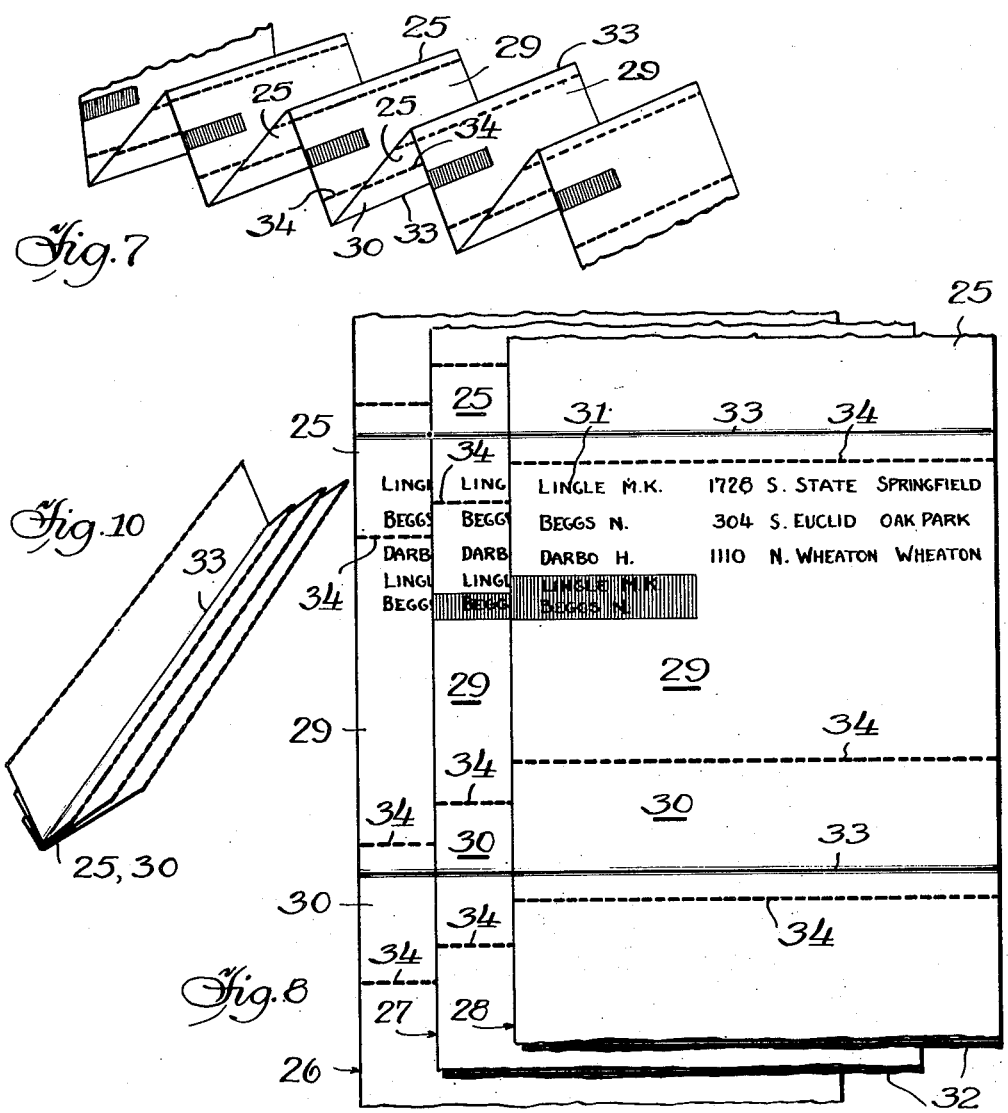
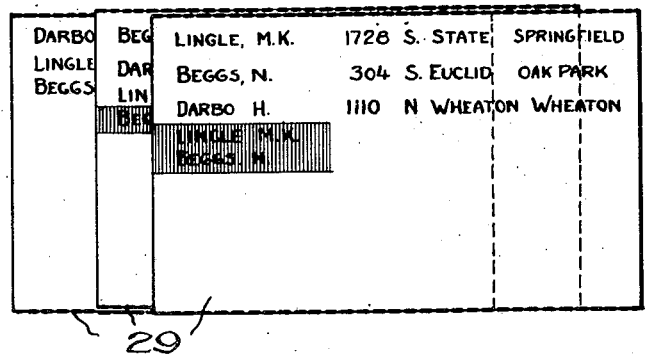

Aug. 5, 1952  M. K. LINGLE  2,606,043
INDEXING SYSTEM
Filed Aug. 20, 1947  5 Sheets-Sheet 4
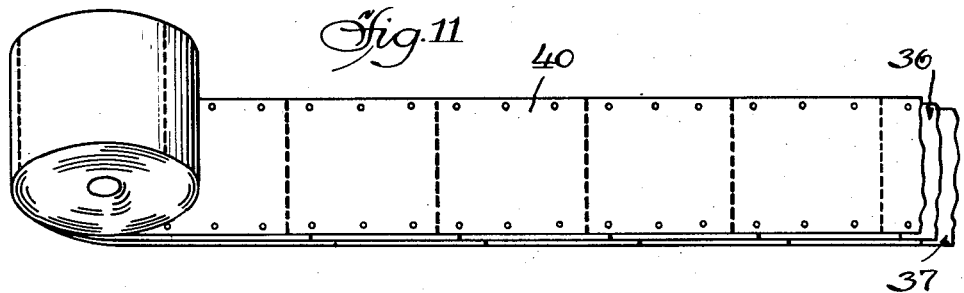
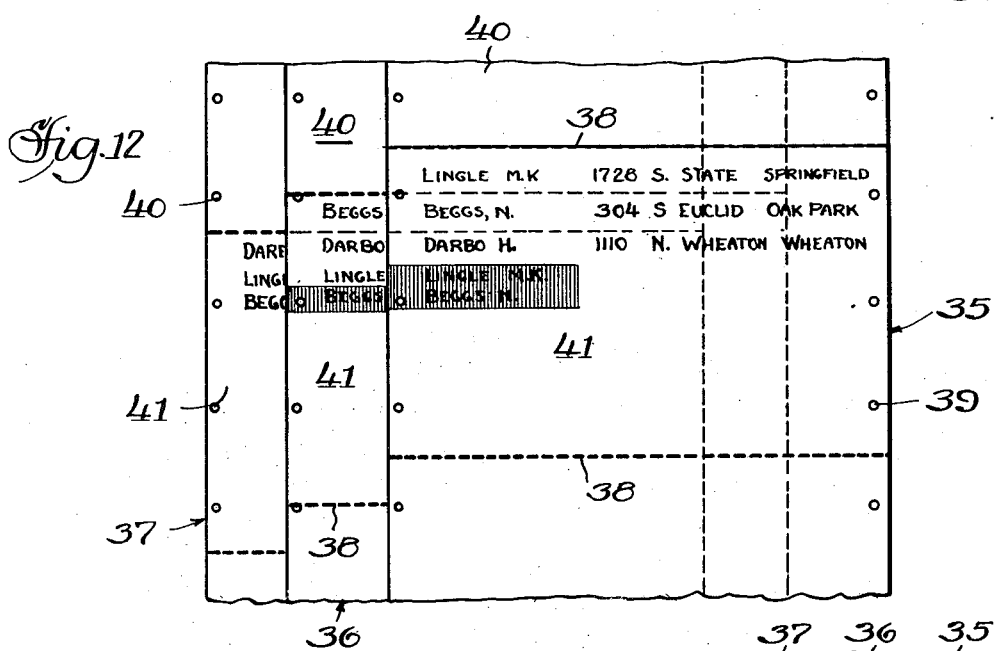
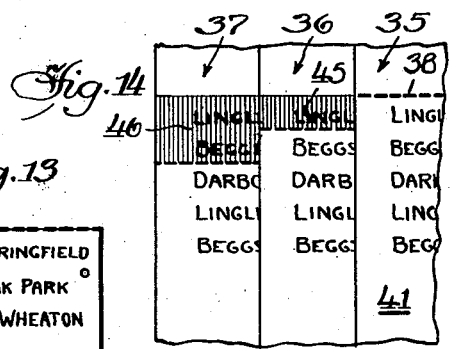
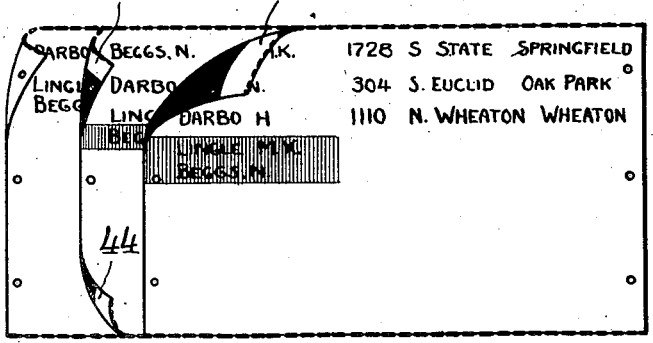
INVENTOR.
Myron K. Lingle
BY
Tesch and Darbo
Attys.

Aug. 5, 1952           M. K. LINGLE           2,606,043
INDEXING SYSTEM
Filed Aug. 20, 1947           5 Sheets-Sheet 5
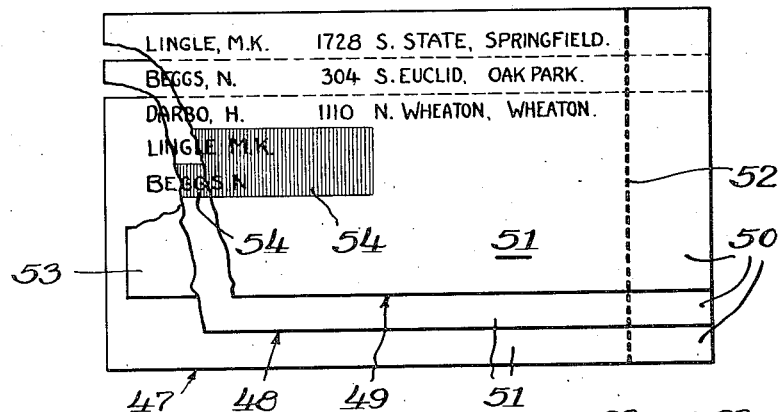
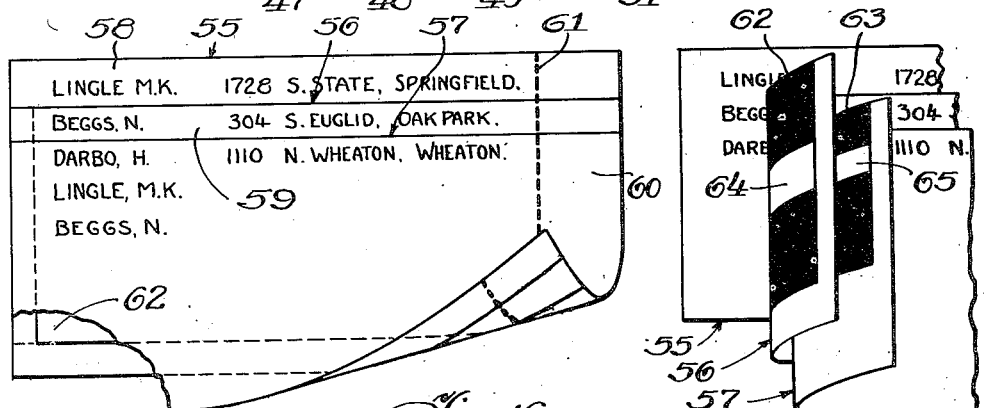
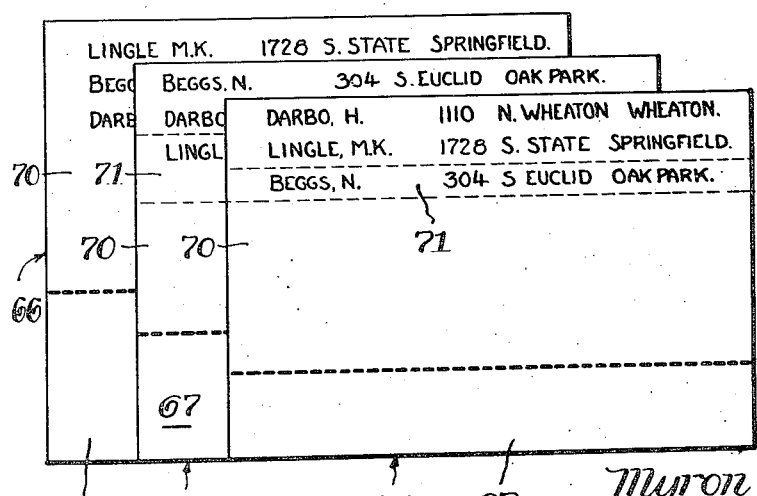
INVENTOR.
Myron K. Lingle Patented Aug. 5, 1952

2,606,043

UNITED STATES PATENT OFFICE 2,606,043

INDEXING SYSTEM

Myron K. Lingle, Springfield, Ill.

Application August 20, 1947, Serial No. 769,587

3 Claims. (Cl. 282—23)

This invention relates to indexing systems and more particularly to a system of card indexing with provision for cross-referencing.

The principal objects of the invention are to provide:

One, a set of forms so arranged as to produce by means of a single typing a set of index cards of equal size, each card carrying in uppermost position a different one of a plurality of indicial headings;

Two, a set of forms for producing such a set of index cards each of which carries cross-references to the other headings of the group in addition to the principal indicial heading;

Three, a set of forms for producing such a set of index cards wherein the principal indicial heading on each card is an original typewrtier impression;

Four, a set of superposed continuous strips of forms and transfer media for the production of such index and cross-reference cards;

Five, a method of preparing such index and cross-reference cards; and

Six, a system for economically and expeditiously matching and indexing related documents and the like.

Subsidiary objects and the many advantages of the invention will become apparent as the description thereof proceeds.

In the accompanying drawings.

Figure 1:
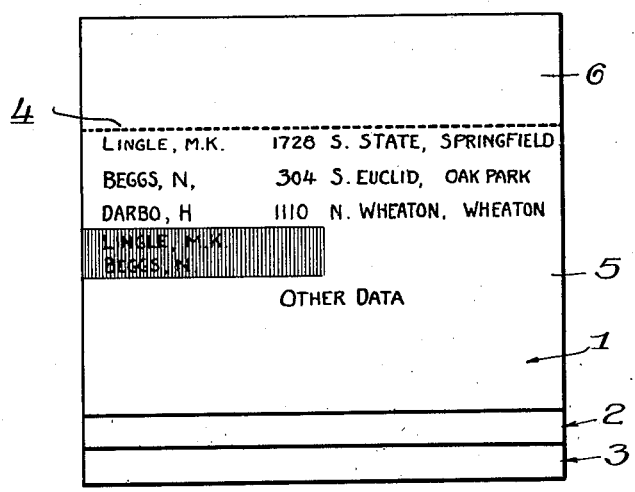
Fig. 1 is a face view of a three-card form assembly with indicial headings typed thereon.
Figure 2:
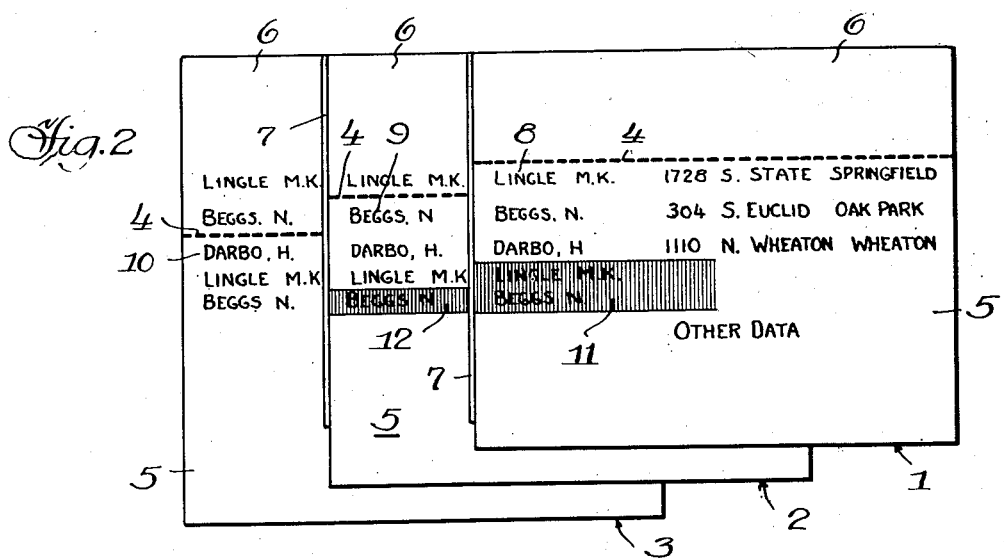
Fig. 2 is a view of the forms of Fig. 1 shifted sidewise to show their relationship and structural details.
Figure 3:
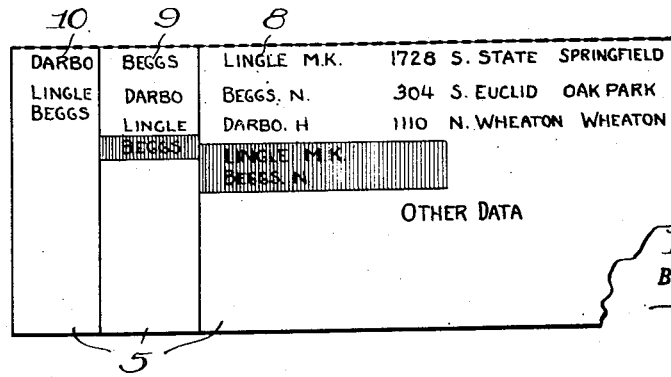
Fig. 3 illustrates the three indexing cards produced from the assembly of Fig. 1.

Figs. 4, 5, and 6 are views similar to those of Figs. 1, 2, and 3, respectively, illustrating a four-card form assembly with bottom stubs;

Fig. 7 is a perspective view of an accordion-folded continuous strip assembly of card forms;

Fig. 8 is a detail view of the elements of the assembly of Fig. 7 shifted sidewise for illustrative purposes;

Fig. 9 illustrates the finished cards produced from the assembly of Figs. 7 and 8;

Fig. 10 is a perspective view of the stub torn from the card in the separation process;

Fig. 11 is a perspective view of a rolled form of continuous strip card forms;

Fig. 12 is a detail view of the component elements of the assembly of Fig. 11 shifted sidewise for purposes of illustration;

Fig. 13 illustrates the finished cards produced from the assembly of Figs. 11 and 12;

Fig. 14 is a fragmentary view showing a modified form of the device of Fig. 12;

Fig. 15 is a broken face view showing a modification of the assembly of Fig. 1 wherein the stubs are attached at one side of the form area;

Figs. 16 and 17 illustrate a further modification of the invention; and

Fig. 18 is a view similar to that of Fig. 5 and illustrating a modified form of the invention as illustrated in said Fig. 5.

The continuously increasing complexity of business affairs and social relationship and responsibilities require correspondingly improved and more efficient means for controlling and correlating the various segments of activity. Business forms and indexing systems must be efficiently designed to avoid unduly burdensome "paper work." The invention herein described is calculated to minimize the time required to insert indexing cards and the like in a typewriter and to type the necessary indicia to produce the required number of cards. While the invention is adaptable to a great variety of requirements, its use will be exemplified by the following description of its application to the problem of matching, cross-referencing and filing automobile accident reports rendered independently by the several principals involved to a state agency.

An assembly of forms as prepared for use in the production of a single set of three index cards to index three headings is illustrated in Fig. 1. As shown more clearly in Fig. 2, this assembly is made up of three sheets, 1, 2, and 3, of paper or other suitable writing material. A line of perforations 4 divides each sheet into a card portion 5 and a stub portion 6. The card portion is the useful form area, the card form whose area is used to record desired indicia; the stub portion is to be eventually discarded. Carbon paper 7 or other suitable transfer media is interleaved between sheets 1 and 2 and sheets 2 and 3. The assembly is fastened together by cementing, stapling, or otherwise fastening the stub portions together.

While card form portions 5 of the several sheets are of equal size for eventual convenient filing, the stub portions, and therefore the three sheets, themselves, increase in length from top to bottom of the assembly. The length of stub 6 of sheet 2 is greater in length than that of sheet 1 by the width of the space provided for the indicial heading 8 of sheet 1 and the length of the stub portion of sheet 3 is similarly longer than that of sheet 2 in an amount equal to the width of the space provided for the indicial heading 9 of sheet 2. Thus, the form area or card 5 of sheet 1 overlaps the line of perforations 4 of sheet 2 by the width of the marginal portion of form area 5 adjacent the line of perforations of sheet 1 provided for indicial heading 8.

As will be apparent from the foregoing description, the top boundary of the form area of each sheet which eventually forms the finished card edge immediately above the heading is straight. For example, in the device of Figs. 1-3, the lines of perforations 4 provide straight top sides of form areas 5. These straight bounding sides of the underlying sheets establish lines which lie between the typed headings of the overlying sheets to allocate properly the transferred headings as between the stub and form area portions of the sheets. The straight top edges are also desirable, of course, for convenience in filing and using the finished cards.

The form areas 5 of the sheets are divided into heading portions having spaces for the indicial headings, and body portions intended to receive data to be recorded on all cars of the set. In the device of Fig. 1, the portion above the notation "Other Data" is intended for the headings. As will be seen most clearly from Fig. 2, a part of the heading portion of all form areas are in register and provided with transfer media. The same is true of the body portions on the lower part of the form areas.

In using the form assembly so described, the typist inserts the unit in a typewriter and enters the three headings in the three spaces provided at the top portion of card 5 of sheet 1. The carbon paper 7 serves to transfer the typed impression to sheets 2 and 3. It will be seen that the indicial heading 8 of the card of sheet 1 is reproduced by the carbon paper upon the stub portions 6 of sheets 2 and 3. The second heading typed upon the card of sheet 1 (which may serve as a cross reference thereon) is reproduced in the uppermost position on the form area of sheet 2 and thus becomes the principal indicial heading 9 of this card. This heading also appears on the stub portion of sheet 3. The third heading appears in secondary or cross reference position on the cards of sheets 1 and 2 and becomes the principal indicial heading 10 of sheet 3.

In order to show all three headings on each of the three cards, it is necessary to repeat the first and second headings as shown on sheet 1. The area 11 immediately under the space provided for the headings upon which the repeated items are typed may be shaded in printing the forms to render the characters only sufficiently distinguishable to enable the typist to check her work. A narrower area 12 is shaded on sheet 2 and no shading is done on sheet 3 since there is no repetition of headings appearing on the card form area of this sheet.

Any data which is desired to appear upon all of the three index cards may be typed upon the lower portion of the card of sheet 1 to be reproduced by means of the carbon paper upon sheets 2 and 3.

Having completed the typing, the form assembly is removed from the typewriter and the stubs 6 are detached from cards 5 by snapping them off along the perforated line 4. Carbon paper sheets 7 are preferably terminated short of the bottom edge of card 1 to leave a margin for holding the cards as the stubs are being removed. In this way the carbon paper is removed with the stubs. The cards 5, shown in finished form in Fig. 3, are then ready for filing.

It will be noted that the arrangement of the sheets in the assembly of Figs. 1 and 2 may be reserved; that is, sheet 3 may be placed on top and sheet 1 on the bottom. With this alternative arrangement, the first two headings would be typed directly upon stub 6 of sheet 5 and the shaded areas of the two underlying cards would be located at the tops of the form areas and the indicial headings would be spaced from the top sides of these cards.

Where the card indexing system thus described is to be used for the matching and filing of accident reports, the cards are prepared from the information given in the first report to be received from a person involved in the accident, as the owner of one of the cars, a pedestrian injured, etc. The case is given an accident number and the time and place of the accident are noted on the cards. When additional reports or supplementary documents are received, the card file is consulted to determine whether a number has been assigned to the particular accident and a file prepared, or to determine the accident number and thus bring the newly arrived documents together with those already on file. If a particular case involves more than three principal names, two or more sets of forms may be used to properly index it.

The system illustrated in Figs. 4 to 6 is closely similar to that above described. Four indicial headings, 13, 14, 15, and 16, are involved and therefore four sheets, 17, 18, 19, and 20, are necessary to produce the requisite four cards. Four spaces are provided for the listing of the four headings and the first three headings are repeated on shaded area 21 in the manner and for the reasons above described. As an alternative for shading, slots may be cut in cards 17, 18, and 19 in place of shading, thereby permitting the direct typing of names on the lower cards.

In this particular embodiment of the invention, the relative positions of stubs 22 and form areas or cards 23 are reversed, the cards being located above the stubs on the sheets. The sheets are fastened together by cementing or stapling the lower edges of the stubs together. Instead of carbon paper sheets as the transfer media, a suitable transfer preparation may be printed directly upon the reverse sides of the sheets, as shown at 24. The cards and stubs are detached from each other after completion of the typing in the manner above described. The finished cards, shown in Fig. 6, are then ready for filing.

Where one or more typewriting machines are to be used exclusively for the production of indexing cards, it is desirable to prepare the form assemblies in continuous strips in order that they may feed continuously into the typewriter as the work proceeds. One arrangement of forms for use in such a system is illustrated in Figs. 7 to 10.

The make-up of this arrangement may be considered to be a combination of the two types hereinabove described in that stubs 25 are attached in the form strips 26, 27, and 28 to the tops of form areas or cards 29, as in the forms of Fig. 2, and stubs 30 are attached to the bottom edges of cards 29, as in the forms of Fig. 5. As in all illustrated embodiments of the invention, cards 29 are of equal size. In assembling the forms, strip 28 is advanced with respect to strip 27 a distance equal to the width of the marginal portion of the card provided for indicial heading 31, and strip 27, in turn, is similarly advanced in relation to strip 26. Carbon paper strips 32 are interleaved and the assembly, thus arranged, is accordion-folded, as shown in Fig. 7, along fold lines 33 and packed into a suitable container ready for use.

To prepare the index cards, the strip assembly is threaded into the typewriter and the headings and other indicia are entered directly upon the top card form. When this is completed, additional card forms are fed into the typewriter without the necessity of re-threading. As the finished work is withdrawn from the typewriter, cards 29 are separated from stubs 25 and 30 by tearing along perforated lines 34. The cards, shown separately in completed form in Fig. 9, are then ready for filing and the stubs, shown separately in Fig. 10, are discarded.

A continuous strip assembly in roll form is illustrated in Figs. 11 to 13. Strips 35, 36, and 37, having been first imprinted with the desired format, if any, perforated along equally spaced transverse lines 38, punched with sprocket holes 39 along at least one edge, and carboned upon their reverse side, are assembled in staggered relationship to each other, as shown in Fig. 12. In this embodiment of the invention, there are no stubs, card portions 40 being immediately followed by card forms 41 in a continuous series.

In applying transfer carbon to the reverse side of strip 35, the area 42 (Fig. 13) underlying the space provided for the indicial heading of the card form may be left blank to avoid reproduction of this heading upon the lower portion of the preceding card form 40. Similarly, a blank area 43 may be left at the top of the card form of sheet 36. In addition, an area 44 of approximately the same size may be left blank along the bottom of the card form areas of strip 36 to avoid reproduction of the indicial headings of the cards of strip 35 upon the card forms of strip 37. Or, as an alternative to the blanking of certain areas in this manner, the lower portions of the card forms of strips 36 and 37 may be shaded to mask transferred headings as shown at 45, 46, of Fig. 14.

The manner in which this form of the invention is used will be apparent from the foregoing descriptions. A typewriter having a sprocket wheel or wheels mounted upon the roller is used. The wheel or wheels cooperate with sprocket holes 39 to maintain the several strips of the form assembly in proper register. As the typing is completed, the finished cards are separated from each other and are then ready for filing.

Careful consideration and a thorough understanding of the invention will indicate many possible modifications of the forms above described. In the form unit illustrated in Fig. 15, sheets 47, 48, and 49 are assembled in the desired relationship by means of stubs 50 which are attached to the card form areas 51 along a line of perforations 52 at one side thereof. Sheets 53 of carbon paper are inserted between sheets 47 and 48 and between sheets 48 and 49, the carbon paper terminating short of the sides of the card form areas opposite from stubs 50 to permit grasping of the completed cards while the stubs and carbon sheets are removed together. For purposes described above, shaded areas 54 may be imprinted upon the forms.

The manner in which this form of the invention is used will be readily understood. The several headings are typed upon form area 51 of sheet 49, any other desired data is typed upon the space provided therefor, the assembly is removed from the typewriting machine, the stubs and carbons are removed and the completed cards, thus produced, are ready for filing.

If desired, the arrangement of the several sheets, such as sheets 17, 18, 19, and 20 of Figs. 4 and 5 may be reversed in order to provide for the direct ribbon impression of the principal indicial heading of each card. Such an arrangement is illustrated in Figs. 16 and 17. In this form of the invention, sheets 55, 56, and 57, preferably are of identical dimensions, are superposed with the spaces 58 and 59 provided for the indicial headings of the card form areas of sheets 55 and 56 exposed above the top edges of the immediately superjacent sheets. Stubs 60, attached to the card form areas along a line of perforations 61 are fastened together. Sheets 62 and 63 of carbon paper are interleaved in the assembly. Areas 64 and 65 of the carbon paper sheets are coated with a suitable film to prevent reproduction of impressions falling within these areas.

In producing cards from this form assembly, the indicial headings are typed in order in the manner above described, the first two headings being repeated for cross reference purposes. It will be noted that direct ribbon impressions are impressed upon the three cards as primary indicial headings. Shaded areas are not necessary, since each card, as produced in this manner, carries only the three headings.

The form of the invention illustrated in Fig. 18 is a further modification of the device of Fig. 5. The arrangement of the sheets is reversed, sheet 66, having the widest stub 67, forming the bottom sheet, sheet 68, having the narrowest stub, being the top sheet, and sheet 69, having the stub of intermediate width, being placed between sheets 66 and 68. As in other similar assemblies, stubs 67 are fastened together. The reverse sides of at least the card form areas 70 are coated with a transfer medium, except that the areas 71, indicated by dotted lines, are uncoated in order to prevent reproduction of the headings impressed upon superjacent sheets in these areas.

As in the case of the cards of Figs. 16 and 17, the cards produced from the assembly of Fig. 18 carry indicial headings impressed directly by the typewriting machine.

While the invention has been described in detail in order to fully disclose the same, it is not practicable to describe the many additional modifications to which it is adaptable nor to enumerate the multitude of applications of its underlying principle. To suggest some of the possible modifications, it may be noted that the arrangement of the superposed sheets may be reversed to overlap the bottom, rather than the top, edges of the form areas, in which event the lowermost item on each card will not appear on the next subjacent card. The stub of the top sheet of the assembly of Fig. 2, or of the bottom sheet of that of Fig. 5, may be eliminated unless desired for fastening purposes to hold the assembly together. Varying widths of sheets and strips may be used and the finished cards may be severed from the sheet or strip by cutting, or otherwise, if desired, rather than by means of perforations. If desired, the assemblies of Figs. 15 and 16 may be provided with stubs on both sides.

Various combinations of the several expedients illustrated in the different embodiments shown may be employed without departing from the principle of the invention.

Invention is claimed as follows:

1. In preparing cross index cards for a given number of headings wherein each card carries a different one of the headings in uppermost position thereon and all of the remaining headings in subordinate position thereunder, said cards being prepared from an assembly of superposed rectangular paper sheets of equal width and coterminous vertical edges and interleaved transfer media, each sheet having a line of perforations extending crosswise between vertical edges thereof and dividing said sheet into a rectangular card form and a stub, the card forms of all sheets of said assembly being equal in size and similarly oriented with respect to the lines of perforations, the stubs of successive sheets in one direction in said assembly progressively decreasing in vertical dimension in such magnitude that a horizontal marginal portion of each card form extends beyond the card from of the adjacent sheet and a portion of the card forms of all sheets are in register, the method which comprises inserting said assembly in a typewriting machine, entering said headings one under the other beginning with the marginal portion of the card form extending vertically uppermost in said assembly and entering a succeeding heading in the marginal portion of a card form next uppermost in said assembly, repeating at least all except the last of said headings, removing said assembly from said typewriting machine and separating said card forms from said stubs along said lines of perforations.

2. In preparing cross index cards for a given number of headings wherein each card carries a different one of the headings in uppermost position thereon and all of the remaining headings in subordinate position thereunder, said cards being prepared from an assembly of superposed rectangular paper sheets and transfer media interleaved between said sheets, said sheets being of equal width and arranged with coterminous side and top edges and being fastened together along their top edges, each sheet having a line of perforations extending crosswise from side to side thereof and dividing said sheet into a rectangular card form under said line and a stub above said line, the card forms of all sheets of said assembly being equal in size, the stub of each successive sheet decreasing in vertical dimension from bottom to top of said assembly whereby a portion adjacent the top of each card form above the lowermost sheet overlaps a portion of the stub of the immediately underlying sheet, the method which comprises inserting said assembly in a typewriting machine, entering said headings one under the other beginning with the marginal portion at the top of the card form at the top of said assembly and entering a succeeding heading in the marginal portion at the top of the card form of a successive sheet in said assembly, repeating at least all except the last of said headings, removing said assembly from said typewriting machine and separating said card forms from said stubs along said lines of perforations.

3. In preparing cross index cards for a given number of headings wherein each card carries a different one of the headings in uppermost position thereon and all of the remaining headings in subordinate position thereunder, said cards being prepared from an assembly of superposed rectangular paper sheets and transfer media interleaved between said sheets, said sheets being of equal width and arranged with coterminous side and bottom edges, each sheet having a line of perforations extending crosswise from side to side thereof and dividing said sheet into a rectangular card form above said line and a stub below said line, the card forms of all sheets of said assembly being equal in size, the stub of each successive sheet decreasing in vertical dimension from bottom to top of said assembly whereby a portion adjacent the top of each card form below the uppermost sheet extends above the upper edge of the immediately overlying sheet, a portion of the card forms of all sheets being in register, the method which comprises inserting said assembly in a typewriting machine, entering said headings one under the other beginning with the marginal portion at the top of the card form at the bottom of said assembly and entering a succeeding heading in the marginal portion at the top of the card form of a successive sheet in said assembly, repeating at least all except the last of said headings, removing said assembly from said typewriting machine and separating said card forms from said stubs along said lines of perforations.

MYRON K. LINGLE.

REFERENCES CITED

The following references are of record in the file of this patent:

UNITED STATES PATENTS

| Number | Name | Date |
| --- | --- | --- |
| 2,092,127 | Lankton | Sept. 7, 1937 |
| 2,173,332 | Hoffmann | Sept. 19, 1939 |
| 2,352,134 | Stone | June 20, 1944 |
| 2,368,531 | Erickson | Jan. 30, 1945 |